(12) United States Patent
Lutz

(10) Patent No.: US 9,373,990 B2
(45) Date of Patent: Jun. 21, 2016

(54) CARBON BRUSH WITH DISCONNECTION APPARATUS

(75) Inventor: Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 13/880,759

(22) PCT Filed: Oct. 11, 2011

(86) PCT No.: PCT/EP2011/067706
§ 371 (c)(1),
(2), (4) Date: Jul. 3, 2013

(87) PCT Pub. No.: WO2012/052319
PCT Pub. Date: Apr. 26, 2012

(65) Prior Publication Data
US 2013/0270963 A1  Oct. 17, 2013

(30) Foreign Application Priority Data
Oct. 22, 2010 (DE) .......................... 10 2010 042 804

(51) Int. Cl.
*H02K 13/00* (2006.01)
*H02K 13/10* (2006.01)
*H01R 39/27* (2006.01)
*H01R 39/38* (2006.01)
(Continued)

(52) U.S. Cl.
CPC ................ *H02K 13/10* (2013.01); *H01R 39/27* (2013.01); *H01R 39/381* (2013.01); *H01R 39/58* (2013.01); *H01R 39/415* (2013.01)

(58) Field of Classification Search
CPC ....... H02K 13/10; H02K 5/148; H01R 39/27; H01R 39/58

USPC ......... 310/239, 240, 241, 242, 243, 244, 245, 310/246, 247, 248

See application file for complete search history.

(56) References Cited

U.S. PATENT DOCUMENTS

| 2,986,666 A | 5/1961 | Tsutsumi |
| 4,250,613 A | 2/1981 | Sauerwein et al. |
| 6,087,754 A | 7/2000 | Berger |

FOREIGN PATENT DOCUMENTS

| DE | 847 307 C | 8/1952 |
| DE | 1 679 529 U | 7/1954 |
| DE | 2 135 617 A1 | 1/1973 |

(Continued)

OTHER PUBLICATIONS

International Search Report corresponding to PCT Application No. PCT/EP2011/067706, mailed Dec. 13, 2011 (German and English language document) (6 pages).

*Primary Examiner* — Hanh Nguyen

(74) *Attorney, Agent, or Firm* — Maginot, Moore & Beck LLP

(57) ABSTRACT

A carbon brush with a disconnection apparatus in a cavity in a brush body includes a disconnection body and a prestressed compression-spring body. The disconnection body consists of an electrically insulating material, and the prestressed compression-spring body is configured to act resiliently on the disconnection body. The compression-spring body is formed together with the disconnection body as a short component with a short axial length. In one embodiment, the compression-spring body is in the form of a spring with a plurality of spring turns which, at least in the prestressed, compressed state, are at least partially located one inside the other, shortening them.

11 Claims, 4 Drawing Sheets

(51) Int. Cl.
*H01R 39/58* (2006.01)
*H01R 39/415* (2006.01)

(56) References Cited

FOREIGN PATENT DOCUMENTS

| | | | |
|---|---|---|---|
| DE | 28 01 839 | A1 | 7/1979 |
| DE | EP 0 023 537 | A1 * | 2/1981 ............. H01R 39/58 |
| DE | 94 06 246.3 | U1 | 7/1994 |
| DE | 100 64 501 | A1 | 7/2002 |
| DE | 101 55 991 | A1 | 6/2003 |
| EP | 0 937 320 | B1 | 8/1999 |
| GB | 0 118 520 | | 9/1918 |
| GB | 250665 | A | 4/1926 |
| JP | 54-37922 | Y2 | 11/1979 |
| JP | 03-270661 | * | 12/1991 ............. H02K 13/00 |
| JP | 2503672 | Y2 | 7/1996 |
| WO | 02/052685 | A1 | 7/2002 |

* cited by examiner

CARBON BRUSH WITH DISCONNECTION APPARATUS

This application is a 35 U.S.C. §371 National Stage Application of PCT/EP2011/067706, filed on Oct. 11, 2011, which claims the benefit of priority to Serial No. DE 10 2010 042 804.3, filed on Oct. 22, 2010 in Germany, the disclosures of which are incorporated herein by reference in their entirety.

BACKGROUND

The disclosure is based on a carbon brush with disconnection apparatus according to the description below.

Carbon brushes of this type are known (DE 1 679 529 U1) in which the compression-spring body consists of a cylindrical helical spring, which, in order to achieve the lowest possible overall length of the system of the disconnection apparatus and the greatest possible wear travel of the brush body, can be prestressed and compressed at most to such an extent that the cylindrical turns thereof rest on one another and the spring is prestressed to form a block. This thus leads to a relatively great axial length of such a compression-spring body. On account of the latter, a small usable wear travel of the brush body remains, which results from the ratio of the possible theoretical wear travel of the carbon brush to the length of the disconnection apparatus. A low wear travel as a real useful length of the brush body requires early replacement of the carbon brushes when the latter have exceeded the permissible wear travel. A further disadvantage lies in the fact that cylindrical helical springs, as compression-spring bodies, have a low flexural rigidity. During the disconnection operation, when the compression-spring body has already lifted the brush body off the commutator of an electric motor and has interrupted the power circuit, the electric motor continues to run down. In the case of unbraked machines at idle, this running down can last for 5 to 15 seconds. During this time, transverse forces act on the compression-spring body as a result of the contact of the disconnection body with the rotating commutator, which may lead to severe misalignment of the cylindrical helical spring and to the disconnection body tearing out as a result of this severe misalignment.

SUMMARY

The carbon brush with disconnection apparatus according to the disclosure has the advantage that, by means of the latter, on account of shortening the length of the disconnection apparatus, a greater wear travel is achieved with the same length of the brush body. The axial length of the compression-spring body is preferably shortened. As a result, the system length of the disconnection apparatus is reduced. This leads to economic advantages for both the user and the manufacturer of electric motors and of electrical appliances for domestic use, handicrafts or the like, in which electric motors with carbon brushes according to the disclosure are used. On account of the lengthening of the usable wear length of the carbon brush, an electrical appliance can be operated longer at the user until the time of the controlled disconnection by the disconnection apparatus. As a result, the necessary service intervals and times of use until the disconnection time are lengthened. Idle times which are required for the replacement of carbon brushes are dispensed with. The total period of use of an electrical appliance can thus be increased. The user of an electrical appliance can depend on longer, reliable functioning. Also advantageous are reduced costs for replacement part carbon brushes since, over the total service life of an electrical appliance, fewer replacement parts are needed. Damage to the commutator of the electric motor, to the carbon brushes and to other components of the electrical appliance is reliably avoided and, therefore, repair costs necessitated as a result.

By means of the measures listed in the description below, advantageous developments and improvements of the carbon brush specified below are possible.

One advantageous refinement of the carbon brush provides for the compression-spring body to be formed from at least one spring with a plurality of spring turns, which, at least in the prestressed, compressed state, are located at least partly one inside the other, shortening them. The spring turns located one inside the other lead to a reduced length of the compression-spring body and to a compact configuration and to a higher flexural rigidity, as a result of which the compression-spring body is better able to withstand transverse forces without excessive deformation.

It may be advantageous, for example, if the spring turns have stepped or continuously decreasing diameters in an axial direction, the smaller spring turns being at least to some extent accommodated in the following larger spring turns. This can be implemented, for example, if the compression-spring body is formed as a helical spring with conically or double-conically wound spring turns. As a result of the small turns dipping into the larger and larger turns of the cone, a reduction in the overall space and therefore the axial length of the disconnection apparatus is achieved with an increase in the wear travel of the brush body with the same length of the latter. Compression-spring bodies formed as conical or double-conical helical springs are simple and inexpensive. They are obtainable on the market as common components.

It may also be advantageous if the compression-spring body is formed from at least one wound spring which is wound from a flat material standing on edge. Wound springs of this type are also known under the designation volute springs or pot springs and likewise constitute commercially available components which are available inexpensively. In such a wound spring, in the prestressed compressed state, the strip turns are located at least substantially spirally one inside the other, the spring length being shortened approximately to the width of the wound flat material or strip when the wound spring is compressed completely. The wound spring can be formed single-conically or double-conically. It is of very compact construction and has the advantage of high flexural rigidity, so that it can also withstand high transverse forces without relatively severe misalignment.

It may be advantageous if the cavity containing the compression-spring body and the disconnection body is plugged at one end by a separating disk, above which this plug of metallic powdery materials is located. As a result, reliable axial support for the compression-spring body is achieved. The separating disk prevents metal powder getting into the area of the compression-spring body during the plugging operation, which could lead to interference during the disconnection operation.

It may further be advantageous if, at the end in the area of the plug, the cavity has a recess with a larger diameter than the cavity and if the separating disk and the plug are accommodated in the recess with an enlarged circumferential surface and reduced axial thickness. The plug present to fix the compression-spring body needs a specific circumferential surface for the purpose of secure fixing to the brush body, which is achieved by enlarging the diameter. As a result, the axial dimension of the plug and therefore the overall length of the disconnection apparatus can be reduced, which means that a further increase in the usable wear length is provided.

It may also be advantageous if the axial ends of the compression-spring body are formed as flat contact surfaces to make flat contact with the disconnection body at one end and with the separating disk at the other end. This can be achieved in a straightforward manner by grinding off the ends of the compression-spring body. As a result, spring length can additionally be saved. The block length of the spring is shortened without changing the spring characteristics. Furthermore, as a result of precise contact surfaces of the spring on the disconnection body on the one hand and on the separating disk on the other hand, the functional reliability of the disconnection apparatus is additionally increased since, as a result, the guidance of the disconnection body is improved.

Advantageously, the compression-spring body is formed from metal, in particular from spring steel.

BRIEF DESCRIPTION OF THE DRAWINGS

The disclosure is explained in more detail in the following description by using exemplary embodiments illustrated in the drawings, in which, in each case in a schematic representation.

DETAILED DESCRIPTION

Figure 1:
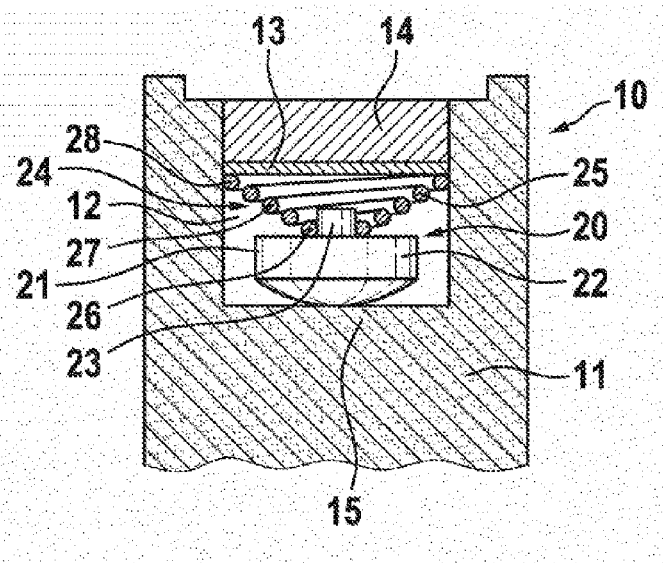
FIG. 1 shows a schematic section with a partial side view of part of a carbon brush with disconnection apparatus according to a first exemplary embodiment with the compression-spring body stressed.
Figure 2:
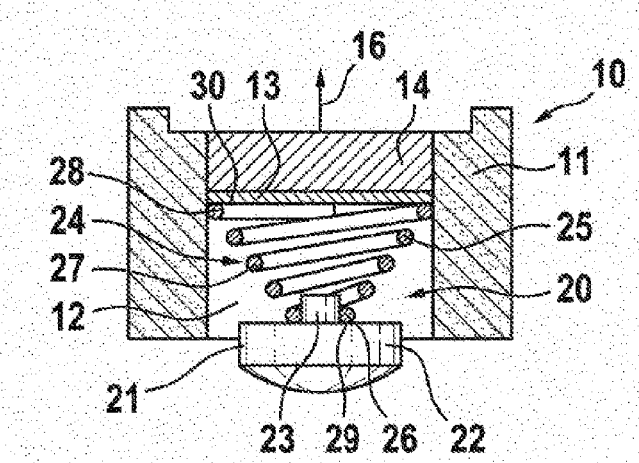
FIG. 2 shows a schematic section of the carbon brush in FIG. 1 with the compression-spring body unstressed.
Figure 3:
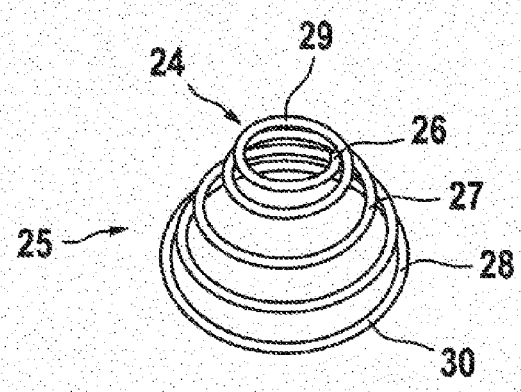
FIG. 3 shows a schematic perspective view of the compression-spring body in FIGS. 1 and 2.

In FIGS. 1 to 3, a first exemplary embodiment of a carbon brush 10 with disconnection apparatus 20 is shown. In a known way, carbon brushes 10 of this type produce the electrical contact with the commutator of electric motors, as are used, for example, for electrical appliances for domestic use or handicrafts, in particular also for hand-held electric machine tools. Carbon brushes 10 of this type comprise a brush body 11 made of graphite, into which the electrical terminal is usually pressed or connected thereto in another way. The necessary contact pressure with which the brush body 11 is pressed against the commutator of the electric motor is provided by a spring element, for example in the form of a spiral spring (EP 0 937 320 B1).

The disconnection apparatus 20 has the purpose of protecting the commutator of the electric motor against mechanical damage or combustion after the carbon brushes have worn out. The disconnection apparatus 20 has a disconnection body 21 made of electrically insulating material, which is formed as a pin or disconnection nipple. In the exemplary embodiment shown, the disconnection body 21 has a rounded head 22 with a pin attachment 23 on the rear side. Also provided is a prestressed compression-spring body 24 which acts resiliently downward on the disconnection body 21 in FIG. 1 and acts with one end on the disconnection body 21. The brush body 11 is provided with a cavity 12, for example a cylindrical cavity, in which the compression-spring body 24 and the disconnection body 21 are held. At the upper end in FIG. 1, the cavity 12 is closed by a separating disk 13, on which the compression-spring body 24 is supported, what is known as a plug 14 made of metallic powdery materials being provided above the separating disk 13, by which the supporting forces of the compression-spring body 24 are absorbed and led into the brush body 11. The separating disk 13 prevents metal powder getting into the area of the cavity 12 and therefore into the area of the compression-spring body 24 during the plugging process, which could lead to interference during the disconnection operation. In FIG. 1, the disconnection apparatus 20 is illustrated in the stressed state of the compression-spring body 24, the brush body 11 not being shown over its complete length but broken off.

As a result of the unavoidable ablation on account of the contact between the carbon brush and the commutator of the rotor of an electric motor (not shown), wear takes place in the carbon brush 10, specifically in the end region which is located opposite the end containing the disconnection apparatus 20. Following complete wearing of the carbon brush 10 during operation, the disconnection body 21 breaks through the material of the carbon brush 10 located in the adjacent area 15 and, under the action of the compression-spring body 24, comes into touching contact with the commutator. As a result, the disconnection body 21 forces the remaining brush body 11 away from the commutator, not shown, in the direction of the arrow 16 via the expanding compression-spring body 24, by which means the power flow is interrupted and the electric motor then switches off in a controlled manner. In order to ensure the disconnection operation, the brush body 11 should lift off the commutator by at least 1 mm, for example. This is achieved by means of appropriate prestressing of the compression-spring body 24, the latter having to ensure that the necessary spring force is applied over the necessary spring travel. Because of this action of the disconnection apparatus 20, damage to the commutator of the rotor of an electric motor is avoided, so that it is necessary for only the worn carbon brushes 10 to be replaced by unused new ones by the user or the service workshop.

It can be seen that the individual components of the disconnection apparatus 20, that is to say the disconnection body 21, the compression-spring body 24, the separating disk 13 and the plug 14, necessitate a certain overall length of the system and determine the usable wear travel of the carbon brush 10. The overall length of the carbon brush 10 is usually predefined by the construction of the electrical appliance, so that, with an appropriate overall length of the system of the disconnection apparatus 20, a relatively small wear travel remains as real usable length. This then requires early replacement of the carbon brushes 10 when the latter have exceeded the permissible wear travel.

In the carbon brush 10 with disconnection apparatus 20 according to the first exemplary embodiment and according to the disclosure, a high wear travel with identical length of the brush body 11 is achieved by the compression-spring body 24 being formed together with the disconnection body 21 as a short component with a short axial length, which is shown according to FIG. 1 in the stressed state of the compression-spring body 24. Here, the compression-spring body 24 is formed from at least one spring 25 having a plurality of spring turns 26, 27, 28 and further ones, these spring turns 26 to 28 being at least partly located one inside the other, at least in the prestressed, compressed state according to FIG. 1, shortening the compression-spring body 24. It can be seen in FIG. 1 that, for example, the smallest spring turn 26 is accommodated in a following larger spring turn. The fact that the individual spring turns 26 to 28 and further ones are at least partly located one inside the other means that, in the prestressed state of the compression-spring body 24, shortening of the latter is achieved, with the consequence that an enlargement of the usable wear length of the carbon brush 10 is achieved. As a result, the electrical appliance can be operated longer at the user until the time of the controlled disconnection by the disconnection apparatus 20. The necessary service intervals and times of use until the disconnection time are lengthened. Furthermore, idle times which are required for the replacement of the carbon brushes 10 are dispensed with, so that the total period of use of an electrical appliance is lengthened. Also advantageous are reduced costs for replacement part carbon brushes since, over the entire service life of an electrical appliance, fewer replacement parts are needed. As a result of the reduction of the system length of the disconnection apparatus 20 that is achieved, economic advantages thus result both for the manufacturer of an electrical appliance and for the user.

In the first exemplary embodiment according to FIGS. 1 to 3, it can be seen that the individual spring turns 26 to 28 and further ones have diameters that are stepped or continuously decreasing in an axial direction, the small spring turns being accommodated at least to some extent in the following larger spring turns, shortening the axial length of the compression-spring body 24. In this example according to FIGS. 1 to 3, the compression-spring body 24 is formed as a helical spring with conically wound spring turns 26 to 28 and further ones, this helical spring being a single-conical spring 25.

Figure 4:
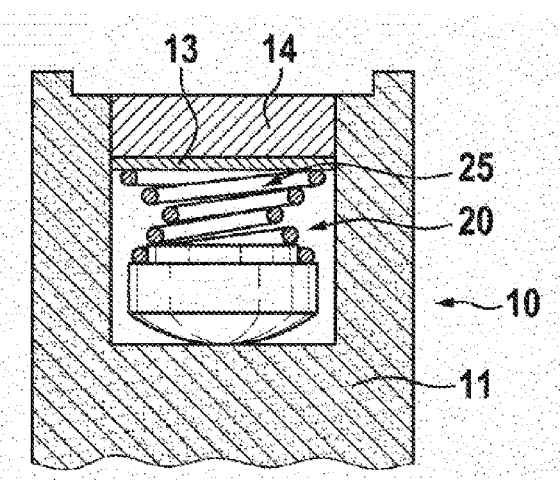
FIG. 4 shows a schematic section with a partial side view of part of a carbon brush with disconnection apparatus according to a second exemplary embodiment with the compression-spring body stressed.
Figure 5:
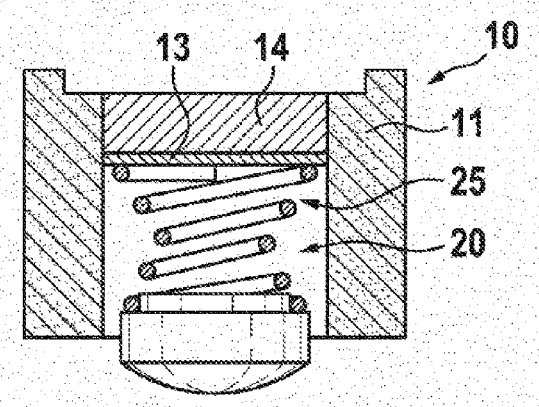
FIG. 5 shows a schematic section of the carbon brush in FIG. 4 with the compression-spring body unstressed.

In the second exemplary embodiment in FIGS. 4 and 5, the same designations are used for the same parts, so that, as a result, reference is made to the description of the first exemplary embodiment. The second exemplary embodiment differs from the first exemplary embodiment in that the spring 25 has double-conically wound spring turns, such that the upper part of the spring 25 in FIGS. 4 and 5 is wound conically, as in the case of the spring 25 in FIGS. 1 to 3, and an oppositely conically wound spring part adjoins the latter axially in one piece and, on account of the spring turns in FIGS. 4 and 5, tapers somewhat conically upward, while the upper part of the spring tapers somewhat conically downward.

Figure 6:
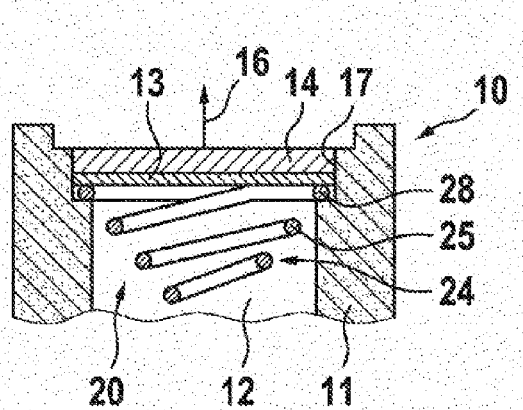
FIG. 6 shows a schematic section of part of a carbon brush with disconnection apparatus according to a third exemplary embodiment.

In the exemplary embodiment according to FIG. 6, the compression-spring body 24 is accommodated by the end which is opposite the disconnection body 21, not visible here, with a turn 28 of greater diameter of the spring 25 in a recess 17 of larger diameter in the brush body 11, and is secured against falling out in the direction opposite to the arrow 16. The separating disk 13 and the plug 14 are also contained in the recess 17. Because of the greater diameter of the recess 17 and therefore the plug 14, the latter has an enlarged circumferential surface, so that with a reduced axial thickness, secure anchoring in the brush body 11 is nevertheless achieved. On account of the reduced axial thickness of the plug 14, the overall length of the disconnection apparatus 20 is reduced further and, in this way, the possible wear travel is increased still further.

In the first exemplary embodiment in FIGS. 1 to 3, it is shown that the axial ends 29 and 30 of the compression-spring body 24 are formed as flat contact surfaces for flat contact both with the disconnection body 21 at one end and with the separating disk 13 at the other end. The spring 25 is, for example, ground off at both ends to produce flat contact surfaces. As a result of grinding the spring ends, a further reduction in the length of the spring 25 is achieved and, as a result, a shortening of the block length of the spring, without changing the spring characteristics in the process. In an advantageous way, a more precise contact surface of the spring 25 on the disconnection body 21 and on the separating disk 13 is also achieved and therefore the functional reliability of the system is increased since, as a result, the guidance of the disconnection body 21 is improved.

In the other exemplary embodiments as well, e.g. according to FIGS. 4 to 6, the axial ends of the compression-spring body 24, in particular of the spring 25, can be provided with corresponding flat contact surfaces for flat contact, for example by grinding off.

Figure 7:
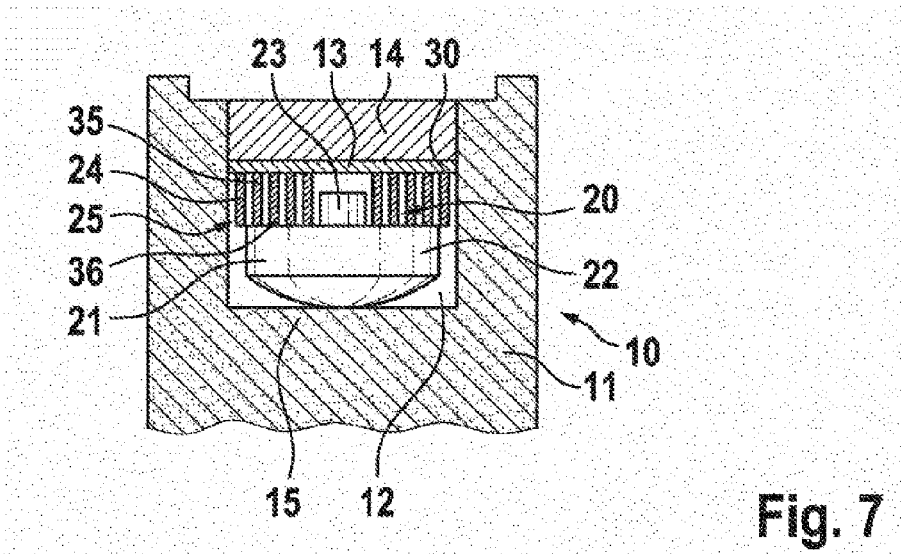
FIG. 7 shows a schematic section with a partial side view of part of a carbon brush with disconnection apparatus according to a fourth exemplary embodiment with the compression-spring body stressed.
Figure 8:
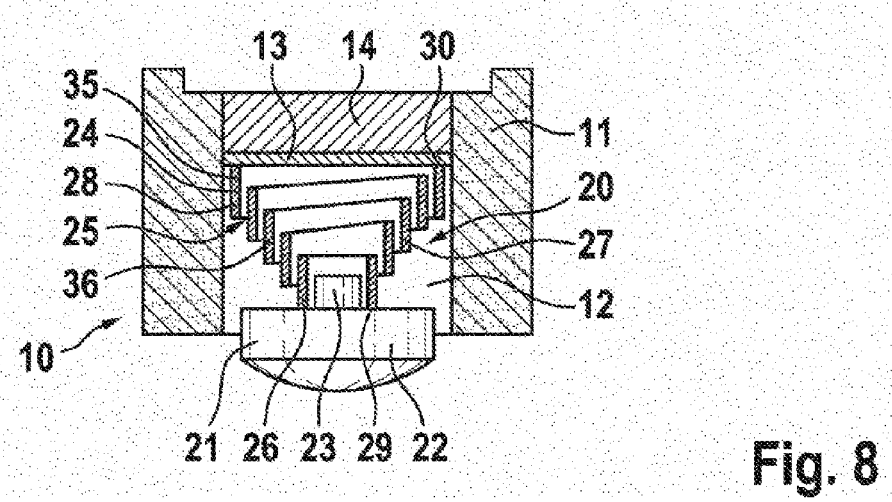
FIG. 8 shows a schematic section of the carbon brush in FIG. 7 with the compression-spring body unstressed.
Figure 9:
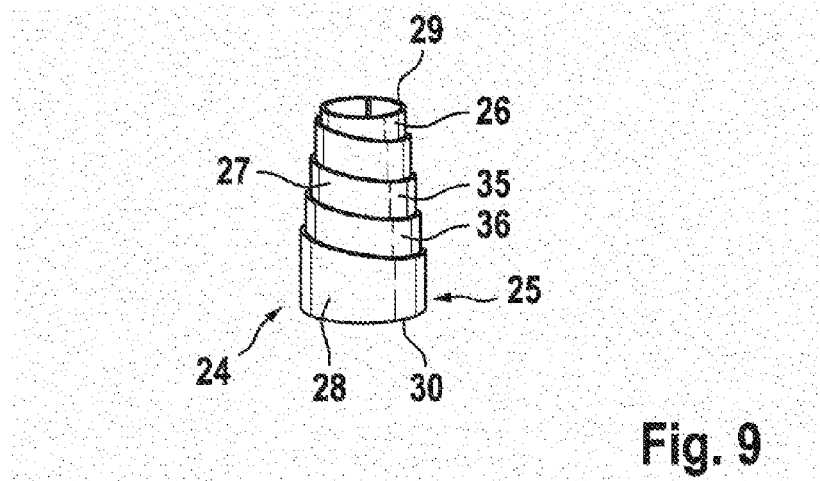
FIG. 9 shows a perspective view of a compression-spring body in FIGS. 7 and 8.

In the fourth exemplary embodiment according to FIGS. 7 to 9, the same designations are used for the same parts, so that, as a result, reference is made to the description of the preceding exemplary embodiments.

In the fourth exemplary embodiment, the compression-spring body 24 is formed from at least one wound spring 35, which is also called a volute spring or pot spring. This wound spring 35 is wound from a flat material or strip 36 standing on edge. In the prestressed compressed state according to FIG. 7, the individual strip turns are located at least substantially spirally one inside the other, by which means the spring length is shortened approximately to the width of the flat material or strip 36. In FIGS. 7 and 8, the wound spring 35 is placed in such a way that the end 30 of greater diameter rests on the separating disk 13, while the lower end 29 which has a smaller diameter in the unstressed state embraces the pin attachment 23 of the disconnection body 21 and rests axially on the head 22. Also in the first exemplary embodiment according to FIGS. 1 to 3, the spring 25 there is mounted in this way. This has the advantage that, in the event of disconnection, the disconnection body 21 is guided and held securely and reliably by means of the spring 25 or wound spring 35 with regard to transverse forces acting thereon. It can be seen that, in the case of the wound spring 35 according to FIGS. 7 to 9, as a result of the intermeshing of the strip 36, an extremely compact compression-spring body 24 with the smallest possible axial length and a high spring force is achieved. The wound spring 35 is distinguished by high flexural rigidity, which ensures secure guidance of the disconnection body 21 in the unstressed state according to FIG. 8, since even then the strip turns are still located one inside the other and support one another against transverse forces. The high flexural rigidity is of substantial importance, since, during the disconnection operation, when the compression-spring body 24 has already lifted the brush body 11 and the power circuit has been interrupted, the electric motor continues to run down; in the case of unbraked motors at idle, this running down can last for 5 to 15 seconds for example. During this time, transverse forces act on the compression-spring body 24 via the contact between the disconnection body 21 and the rotating commutator, which could cause the disconnection body 21 to tear out as a result of severe misalignment. In the fourth exemplary embodiment, this is counteracted by the wound spring 35 with high flexural rigidity, by means of which the disconnection body 21 is prevented from tearing out as a result of transverse forces arising as the electric motor runs down, since the individual strip turns of the wound spring 35 oppose any possible more severe misalignment because of transverse forces acting and stabilize the wound spring 35. It is also advantageous that a compression-spring body 24 configured in this way is simple and inexpensive and requires little space within the cavity 12. As a result of the small strip turns dipping into the larger and larger strip turns of the single-conically wound spring 35, a considerable reduction in the overall length in the prestressed compressed state according to FIG. 7 results.

Figure 10:
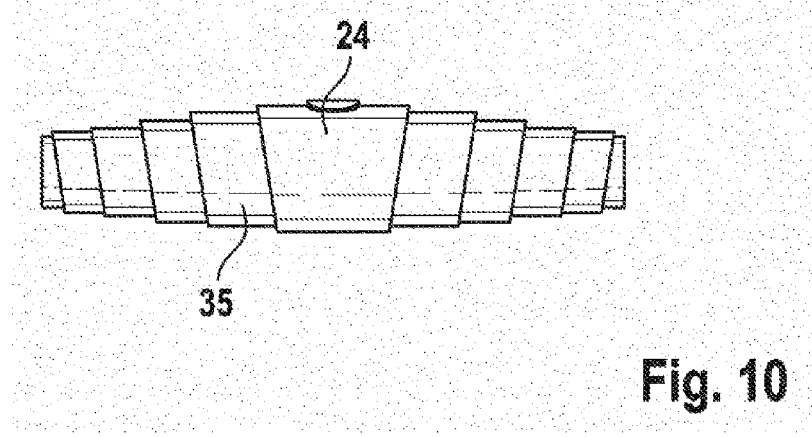
FIG. 10 shows a perspective view of a compression-spring body according to a fifth exemplary embodiment.

In the fifth exemplary embodiment, shown in FIG. 10, differing from FIGS. 7 to 9, the wound spring 35 is formed double-conically. This wound spring 35 is arranged in the cavity 12 in such a way that a conical part in FIGS. 7 and 8 tapers upward, while the other conical spring part tapers downward in the direction of the disconnection body 21, as shown for the single-conical wound spring 35 in FIGS. 7 and 8.

In all the exemplary embodiments, the at least one compression-spring body 24 is formed from metal, in particular from spring steel. When choosing the individual type of the compression-spring body 24, recourse can be had to components which to some extent are available on the market, which means that the expenditure for the compression-spring body 24 is low.

The invention claimed is:

1. A carbon brush with disconnection apparatus, comprising:
    a brush body defining a cavity;
    a disconnection body including electrically insulating material; and
    a prestressed compression-spring body configured to act resiliently on the disconnection body, the compression-spring body configured to move between a compressed state and an uncompressed state,
    wherein the compression-spring body is formed together with the disconnection body as a short component with a short axial length,
    wherein the disconnection body and the compression-spring body are received entirely within the cavity in the brush body when the compression-spring body is in the compressed state,
    wherein an open end of the cavity has a recess with a larger diameter than a diameter of the cavity,
    wherein a separating disk on which the compression-spring body is supported is accommodated in the recess, and
    wherein a coil of the compression-spring body is accommodated in the recess between the separating disk and the brush body.

2. The carbon brush as claimed in claim 1, wherein:
    the compression-spring body is formed from at least one spring with a plurality of spring turns, and
    at least when the at least one spring is in a prestressed, compressed state, the plurality of spring turns are located at least partly inside one another, shortening the plurality of spring turns.

3. The carbon brush as claimed in claim 2, wherein the plurality of spring turns have stepped or continuously decreasing diameters in an axial direction such that smaller spring turns are, at least to some extent, accommodated in following larger spring turns, shortening the plurality of spring turns.

4. The carbon brush as claimed in claim 1, wherein the compression-spring body is formed as a helical spring with conically or double-conically wound spring turns.

5. The carbon brush as claimed in claim 1, wherein:
    the compression-spring body is formed from at least one wound spring wound from a flat strip of material standing on an edge, the flat strip of material having a constant width extending axially from the edge, and
    when the at least one wound spring is in a prestressed, compressed state, spring turns are located at least substantially spirally inside one another such that an axially extending spring length is approximately equal to the width of the flat strip of material.

6. The carbon brush as claimed in claim 5, wherein the at least one wound spring is one of single-conical and double-conical.

7. The carbon brush as claimed in claim 1, wherein the open end of the cavity is closed by the separating disk and an adjoining plug on which the separating disk is supported.

8. The carbon brush as claimed in claim 7, wherein:
    the plug is accommodated in the recess.

9. The carbon brush as claimed in claim 7, wherein:
    the compression-spring body has a first axial end and a second axial end formed as flat contact surfaces, and
    the first axial end is configured to make flat contact with the disconnection body and the second axial end is configured to make flat contact with the separating disk.

10. The carbon brush as claimed in claim 1, wherein the compression-spring body is formed from metal.

11. A carbon brush with disconnection apparatus, comprising:
    a brush body defining a cavity, the cavity having a diameter and an open end;
    a disconnection body including electrically insulating material; and
    a prestressed compression-spring body configured to act resiliently on the disconnection body, wherein:
    a recess is formed at the open end of the cavity, the recess having a diameter that is larger than the diameter of the cavity, and
    a separating disk and adjoining plug configured to support the compression-spring body are accommodated in the recess, and
    a coil of the compression-spring body is accommodated in the recess between the separating disk and the brush body.

* * * * *